Aug. 13, 1935.         W. G. ELLIS         2,010,814
PROTECTIVE DEVICE
Filed March 7, 1932
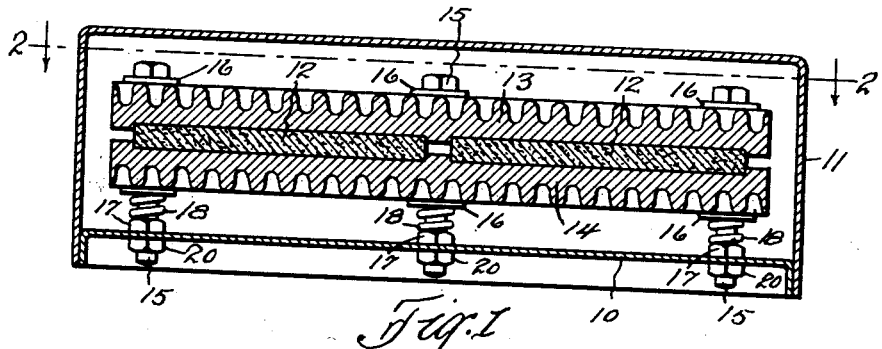
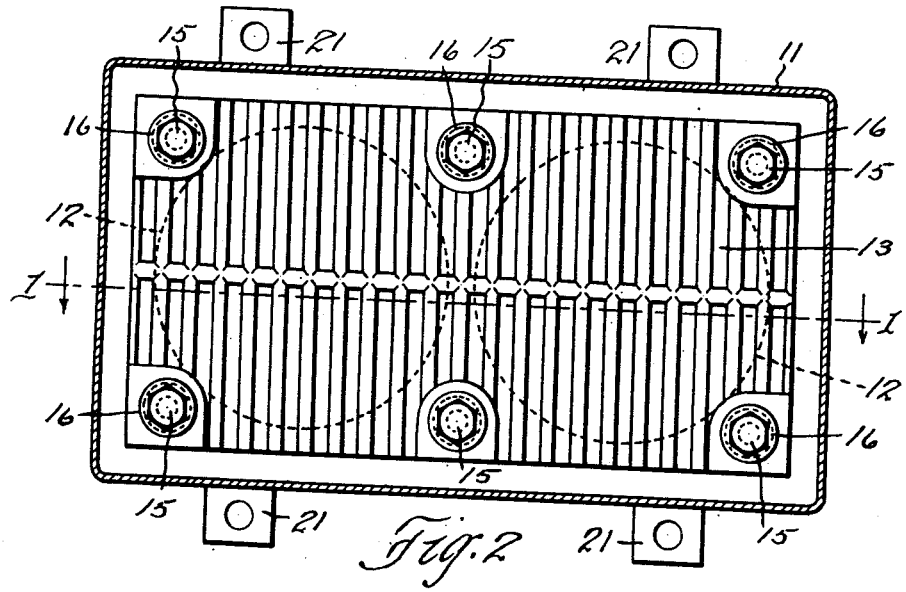
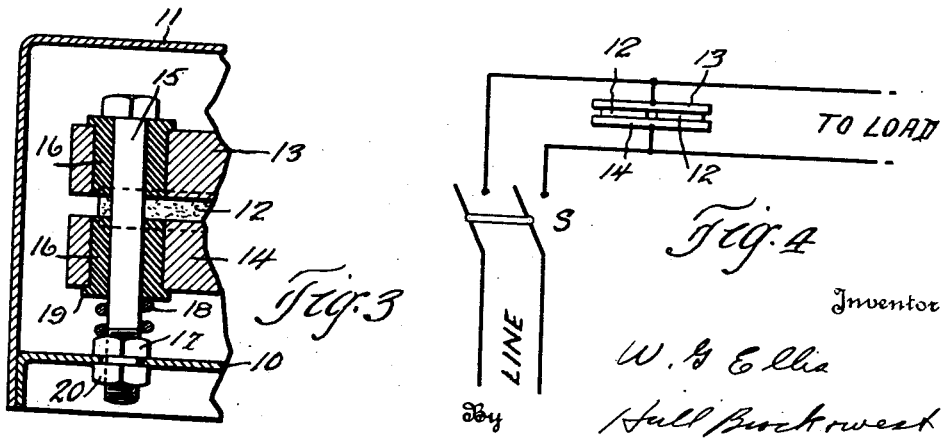
Inventor
W. G. Ellis
By
Attorney Patented Aug. 13, 1935

2,010,814

UNITED STATES PATENT OFFICE 2,010,814

PROTECTIVE DEVICE

William G. Ellis, Philadelphia, Pa., assignor to The Ohio Electric Manufacturing Company, Cleveland, Ohio, a corporation of Ohio Application March 7, 1932, Serial No. 597,181

2 Claims. (Cl. 201—76)

This invention relates to a means for protecting electrical machinery from line surges or over-voltages due to switching and has special reference to the protection of lines which supply direct current to machinery which must be energized and de-energized at intervals.

In many such devices at the instant of breaking the circuit for de-energization the conditions for generation of current are fulfilled. This gives rise to line surges or over-voltages as is well understood by those skilled in the art.

I am aware that prior to my invention it has been recognized in the art that some protective device for this type of system is necessary and various means have been provided for that purpose. I have found that the complicated mechanisms which are put into action through the intervention of levers, links or the like when the switches are opened, are apt to get out of order and fail to operate. The fact that the destruction which might result from failure of these devices is so great makes it highly desirable that an extremely simple protective device should be used, one which can be left at all times in operative connection and one which will not dissipate any considerable quantity of energy in the absence of line surges.

Accordingly the object of my invention is to provide a protective device of the type indicated which shall be exceedingly simple, inexpensive, fool proof and which will not dissipate any considerable quantity of energy at normal voltages. I accomplish the foregoing and other and more limited objects in and through the construction and connections hereinafter described and illustrated in the accompanying drawing in which Fig. 1 is a vertical sectional view; Fig. 2 is a top plan view with a portion of the containing box cut away; Fig. 3 is an enlarged fragmentary detail section; and Fig. 4 is a schematic showing of the connections involved.

Referring now to the drawing, the numeral 10 indicates a sheet metal box bottom upon which the protecting elements are mounted and 11 denotes a cover therefor. The special material employed as a resistance unit is formed into a pair of disks 12 which are clamped between plates 13 and 14. A plurality of bolts 15 pass through the plates 13 and 14, being insulated therefrom by ferrules 16 composed of insulating material. A spring 18 is interposed between the nut 17 and the flange 19 and serves to urge the plates 13 and 14 into clamping relation to the disks 12. The bolt 15 passes through the bottom 10 and is fixedly secured thereto by means of a nut 20. The various bolts are of the same construction. The bottom 10 may be provided with suitable ears 21 for securement of the box to a suitable support. The plates 13 and 14 are preferably provided with radiating fins whereby to dissipate the heat generated by the device during over-load conditions.

In Fig. 4 I have shown a double pole switch S inserted in a line which of course receives its supply of current from a suitable alternating or direct current generator. The device shown in the first three figures of the drawing is indicated schematically by simply showing the plates 13 and 14 with the disks 12 clamped therebetween. The load indicated by the words "To load" in Fig. 4 will be comprised of or at least include electric machinery such as direct or alternating current motors, transformers or the like.

The disks 12 are composed of special material designed to have a hyperbolic resistance-current characteristic. Such a material is described at length both as to the method of producing it and its characteristics in United States Letters Patent No. 1,822,742 issued to K. B. McEachron on September 8, 1931, and is known at "thyrite". Other materials of similar character such, for example, as is described in United States Letters Patent No. 1,121.601 to Thomas B. Allen et al. may be used with greater or less success. It is sufficient that the material should have the property of high resistance at low voltages and much lower resistance at over-voltages such as are apt to be encountered as a result of switching. The manner in which this device operates to protect electric machinery against overloads due to switching surges will be readily understood by those skilled in the art, being based upon the simple laws of parallel circuits. Under normal conditions when normal voltage obtains across the protecting device, the resistance will be high as compared to that of the load, with the result that a very small amount of current will flow through the protecting device and a relatively large amount will flow through the load. Under the abnormally high voltage conditions obtaining during switching, the resistance characteristics of the protecting device will be such as hereinbefore explained so that the resistance of the load will be high as compared to the resistance of the protecting device whereby large current will flow through the protecting device and relatively small current will flow through the load.

Having thus described my invention, what I claim is:

1. A resistor of the kind described comprising a pair of disks, a pair of metallic plates between which said disks are confined, one face of each disk being in contact with each of said plates, a plurality of bolts insulated through said plates, a base plate and said bolts also extending through said base plate, and springs received on said bolt between one of said first mentioned plates and said base plate whereby at the same time to resiliently support the resistor and resiliently mount the same on said base plate, and a cover member telescoping said base plate substantially as described.

2. A resistor of the character described comprising a pair of metallic plates, one or more disks confined between said pair of plates, the opposite faces of the disk or disks being in contact with said plates, a base member, a plurality of bolts projecting from said base member and extending through said plates and insulated therefrom and spring means resiliently supporting said plates and urging them toward each other and into firm contact with said disk or disks, said disk or disks being formed of a material having a hyperbolic resistance-current characteristic.

WILLIAM G. ELLIS.